United States Patent [19]
Glazman

[11] Patent Number: 6,016,190
[45] Date of Patent: Jan. 18, 2000

[54] METHOD AND APPARATUS FOR TRUE TEMPERATURE DETERMINATION

[75] Inventor: Evgeny Glazman, Haifa, Israel

[73] Assignee: 3T True Temperature Technologies, Misgav, Israel

[21] Appl. No.: 09/043,139

[22] PCT Filed: Sep. 6, 1996

[86] PCT No.: PCT/IL96/00102

§ 371 Date: Mar. 6, 1998

§ 102(e) Date: Mar. 6, 1998

[87] PCT Pub. No.: WO97/11340

PCT Pub. Date: Mar. 27, 1997

[30] Foreign Application Priority Data

Sep. 6, 1995 [IL] Israel ......................................... 115192
Apr. 17, 1996 [IL] Israel ......................................... 117951

[51] Int. Cl.$^7$ ................................. G01J 5/48; G01J 5/60
[52] U.S. Cl. ................................. 356/43; 356/45; 374/139
[58] Field of Search ........................ 356/43, 45; 374/139; 250/338.1, 338.3

[56] References Cited

U.S. PATENT DOCUMENTS

| | | | |
|---|---|---|---|
| 4,842,674 | 6/1989 | Freti et al. | 356/43 |
| 5,317,656 | 5/1994 | Moslehi et al. | 385/12 |
| 5,350,236 | 9/1994 | Thakur et al. | 356/43 |
| 5,553,939 | 9/1996 | Dilhac et al. | 356/43 |

FOREIGN PATENT DOCUMENTS

| | | | |
|---|---|---|---|
| 0335224 | 10/1989 | European Pat. Off. | G01J 5/60 |
| 0490290 | 6/1992 | European Pat. Off. | G01J 5/00 |
| 1345776 | 12/1990 | U.S.S.R. . | |
| 1602147 | 5/1991 | U.S.S.R. . | |
| 1563361 | 6/1994 | U.S.S.R. | G01J 5/24 |
| 2160971 | 1/1986 | United Kingdom | G01J 5/10 |
| WO 91/04472 | 4/1991 | WIPO | G01J 5/60 |

OTHER PUBLICATIONS

Brochure: "Focused On True Temperature", True Temperature Measurement for Superior Process Control, 3T True Temperature Technologies.

"A High Speed Ratio Pyrometer", by G.A. Hornbeck, in a Symposium on "Temperature, it's Measurement and Control in Science and Industry", vol. 3, p.p. 425–428, New York, 1962.

"Determination of the Emissivity of a Substance from the Spectrum of its Thermal Radiation and Optimal Methods of Optical Pyrometry", by D.Y. Swet, in "High Temperatures–High Pressures", vol. 8, pp. 493–498, 1976.

"Measurement True Temperature Real–Bodies, Methods and Apparatus Optical Pyrometry", by E.D. Glazman and I.I. Novikov in Science, pp. 21–27, Moskva 1983. (a translation to English is attached).

(List continued on next page.)

*Primary Examiner*—Frank G. Font
*Assistant Examiner*—Roy M. Punnoose
*Attorney, Agent, or Firm*—Abelman, Frayne & Schwab

[57] ABSTRACT

A method of true temperature determination, including, (a) acquiring radiation emitted by an object at a plurality of wavelengths (50), (b) determining a characteristic of the acquired radiation which is based on a relationship between radiative emissions acquired at more than one wavelength (50), (c) determining a factor related to an error, using the characteristic (54) and calculating a current temperature of the object based on the correctional factor (56). Preferably, the factor is a vector of values indicating at least one emissivity value.

40 Claims, 7 Drawing Sheets

OTHER PUBLICATIONS

"Optishe Pyrometrie", by F. Hoffman and C. Tingwaldt, Published by Braunschweig, 1938. (a translation to English is attached).

"Noncontact Temperature Measurement. 1. Interpolation Based Techniques", by M.A. Khan, C. Allemand and T.W. eagar, in Rev. Sci. Instrum., 62(2), pp. 392–402, 1991.

"Some Consideration of Error Brightness and Two–Color Types Spectral Radiation Pyrometers", by E.S. Pyatt, in Brritish Applied Physics, vol. 15, No. 5, pp. 264–268, 1954.

"A Review of Multicolor Pyrometry for Temperatures Below 1500 C", by P.M. reynolds, in British Applied Physics, vol. 15, pp. 579–589, 1964.

"Multi–wavelength Pyrometry", by P.B. Coates, in Metrology, No. 17, pp. 103–109, 1981.

"Methods and device for Measurement of true temperature of objects According to their reference Temperatures (Brightness and Color)", by I.I. Novlkov, et al., in Thermophysics of High Temperatures, vol. 14, p. 1139, 1976.

METHOD AND APPARATUS FOR TRUE TEMPERATURE DETERMINATION

FIELD OF THE INVENTION

The present invention relates generally to optical pyrometry and, more particularly, to determination of temperature deviations during process monitoring.

BACKGROUND OF THE INVENTION

Many industrial processes require precise monitoring of the true temperature, i.e., the thermodynamic temperature, of a material being processed. In some processes, temperature deviations indicate a process failure, in others, changes in temperature and/or emissivity indicate the progression of the monitored process. Examples of processes which require precise temperature monitoring include: metal refining and working, glass and glass product manufacture, firing ceramics, integrated circuit fabrication, electricity generation, chemical and pharmaceutical manufacture and many other industrial processes.

It should be appreciated, that in many cases it is not practical to measure the temperature of the processed material directly, such as by thermocouple, due to the delicacy of the process, the reaction speed of the temperature measurement device or the environmental conditions. Rather, the temperature material. Typically, these emissions are not directly detected, because they must pass through an intervening medium, such as hot air or smoke, which usually has an unknown and variable transmission spectrum.

Several non-contact temperature measurement methods are known in the art. Brightness pyrometry is a general name for temperature measurement methods which determine the temperature of an object based on the total amount of radiation emitted by the object. Typically, only the radiation emitted in a certain spatial direction and within a certain wavelength range is measured. Brightness pyrometry is further described in "Traite de Pyrometric Optique", by C. Ribaud, Paris, 1931.

A major limitation of brightness pyrometry is that the determined temperature is correct only if the product of the emissivity ($\epsilon$) of the object being measured and the emissivity ($\epsilon$) of the object being measured and the transmission spectrum of the intervening medium ($\tau$), is known at each measurement time.

Color-ratio pyrometry is a general name for temperature determination methods which determine the temperature based on the ratio between the intensity of light emitted at first wavelength and the intensity of light emitted at a second wavelength. This pyrometric technique is further described in "Traite de Pyrometric Optique", cited above, in "Optishe Pyrometrie", by F. Hoffman and C. Tingwaldt, published by Braunschweig, 1938 and in "Some Consideration of Error of Brightness and Two-Color Types Spectral Radiation Pyrometers", by E. S. Pyatt, in British Applied Physics, Vol. 15, No. 5, pp. 264–268, 1954.

High accuracy of temperature determination using the color-ratio pyrometric method can only be achieved in cases where the product of the emissivity and the medium transmission spectrum is constant or gray and does not change with respect to time or wavelength. The value of the product does not need to be known. In order to overcome this limitation, an advanced method, described in "High Speed Radio Pyrometry", by G. A. Hornbeck, in a symposium on "Temperature, its Measurement and Control in Science and Industry", Vol. 3, p. 2425, New York, 1962, "A Review of Multicolor Pyrometry for Temperatures Below 1500° C.", by P. M. Reynolds, in British Applied Physics, Vol. 15 pp. 579–589, 1964, and in "Measurement True Temperature Real-Bodies, Methods and Apparatus Optical Pyrometry", by E. D. Glazman and I. I. Novikov in Science 1983, pp. 21–27, Moskva 1983 (in Russian), uses the ratios of the intensities of three or four wavelengths. In the three wavelength method, the requirement for a high accuracy of the result is that $\epsilon(\lambda_1,T)*\epsilon(\lambda_3,T)=\epsilon^2(\lambda_2,T)$, where $\lambda_i$ is the wavelength and T is the true temperature of the object. In the four wavelength method, the requirement for a high accuracy of the results is that $\epsilon(\lambda_1,T) *\epsilon(\lambda_4,T)=\epsilon(\lambda_2,T)*\epsilon(\lambda_3,T)$.

Another pyrometric method, multi-wavelength pyrometry, is a general name for temperature measurement methods which:

(a) determine the apparent temperature at several wavelengths using one of the abovedescribed pyrometric methods; and (b) estimate the true temperature based on a model of the dependency of emissivity on wavelength.

Multi-wavelength techniques are further described in "Determination of Emissivity of a Substance from the Spectrum of its Thermal Radiation and Optimal Methods of Optical Pyrometry", by D. Y. Swet, in "High Temperatures-High Pressures", Vol. 8, pp. 493–498, 1976, "Multi-Wavelength Pyrometry", by P. B. Coates, in Metrology, No. 17, pp. 103–109, 1981 and "Noncontact Temperature Measurement 1, Interpolation Based Techniques", by M. A. Khan, C. Allemand and T. W. Eagar, in Rev. Sci. Instrum., 62(2), pp. 392–402, 1991 the disclosures of which are incorporated herein be reference.

A limitation of multi-wavelength pyrometric techniques is that in many cases the differences between the measured temperatures can be explained by more than one emissivity model, so the true temperature cannot be determined without a correct model. It should be noted that in several applications satisfactory results have been achieved using a simple model.

Some approximation methods suitable for multi-wavelength pyrometry are described in "Determination of Emissivity", "Multi-Wavelength Pyrometry" and "Noncontact Temperature Measurement", cited above. However, these methods are only useful when the dependence of the emissivity on the wavelength is generally known. Otherwise, the error in the true temperature determination may very well be larger than the error in true temperature determination using one of the first two abovedescribed pyrometric techniques.

A major limitation of most known pyrometric techniques is their inability to deal with changes in emissivity, in particular, where such changes cannot be anticipated in advance.

SUMMARY OF THE INVENTION

It is an object of some aspects of the present invention to provide a method of pyrometry capable of accurate measurements of the true temperature of a body even where the emissivity varies with time and/or wavelength.

It is another object of some aspects of the present invention to provide a pyrometric method whose accuracy is not substantially affected by changes in a medium interposed between a pyrometer and the measured body.

It is still another object of some aspects of the present invention to provide a pyrometric method having a high accuracy, preferably over 1%.

It is a further object of some aspects of the present invention to provide a pyrometric method capable of receiving an accuracy-enhancing input in the form of emissivity values.

It is a still further object of some aspects of the present invention to provide a method of measuring the varying emissivity of an object. Further, In some embodiments of the present invention, the true temperature of the object can be used to enhance the accuracy of the measured emissivities.

It is yet another object of some aspects of the present invention to provide a method of monitoring physical parameters of a industrial process, such as temperature, crystallization state and chemical composition, and to provide feedback when the process exceeds certain limits.

In a preferred embodiment of the present invention a method of true temperature determination of an object includes:

(a) measuring radiative emissions from the object;

(b) determining at least one characteristic of the emissions;

(c) finding a match between the determined characteristic and a plurality of characteristics; and (d) calculating the true temperature of the object based on at least one value associated with each of the plurality of characteristics.

Preferably, the radiative emissions are measured at a plurality of discrete wavelengths. Preferably, less than twenty wavelengths are used, more preferably, less than ten and most preferably, less than six wavelengths are used in preferred embodiments of the invention.

A preferred characteristic of radiative emissions is a vector in which each component is indicative of a functional relationship between emissions at at least two different wavelengths. Preferably, each component is the difference between the reciprocals of brightness temperatures. The brightness temperatures are determined by applying the brightness temperature determination method on the measured emissions.

Preferably the values associated with each characteristic are correction factors for correcting imprecisely determined temperatures, preferably emissivities. Thus, one of the brightness temperatures can be corrected to reflect the true temperature using these correctional factors. Alternatively, correction factors can be used to correct a color-ratio temperature.

The calibration of a device according to a preferred embodiment of the present invention comprises:

(a) measuring radiative emissions from the object;

(b) determining a correction value to correct a temperature determined using the emissions to the true temperature of the object; and (c) storing the measured radiative emissions along with the determined correctional value or the true temperature.

In one preferred embodiment the true temperature is determined using a thermocouple. In another preferred embodiment, the true temperature is determined by an input of the emissivity. The emissivity is used to correct one of the determined temperatures. In yet another preferred embodiment, the true temperature is estimated to be equal to a previously determined temperature, at least for determining the correction factor. In such a case, the current true temperature is estimated by correcting one of the temperatures determined from the radiative emissions using the thus derived correction factor.

There is therefore provided in accordance with a preferred embodiment of the present invention, a method of true temperature determination of an object including:

(a) acquiring radiation emitted by an object at a plurality of wavelengths;

(b) determining a characteristic of the acquired radiation which is based on a relationship between radiative emissions acquired at more than one wavelength;

(c) determining a factor related to an error, using the characteristic; and (d) calculating a current temperature of the object based on the correctional factor.

Preferably, determining a factor includes:

attempting to match the determined characteristic with a plurality of stored characteristics to find a matched characteristic; and retrieving a factor associated with the matched characteristic.

Preferably, determining a factor further includes:

determining a new factor based on the acquired radiation and on a previously acquired temperature if the matching attempt fails; and storing the determined characteristic in association with the new factor or with the previously acquired temperature, if the matching attempt fails.

In a preferred embodiment of the invention where the determined characteristic and the plurality of stored characteristic are vectors, attempting to match preferably includes:

choosing a stored vector; and determining if each component in the determined characteristic is within 3% of its corresponding component of the stored vector.

Alternatively or additionally, calculating includes:

determining a temperature based on the acquired radiation, where the determined temperature has an error related to the factor; and correcting the error in the determined temperature using the factor. Preferably, the determined temperature is a brightness temperature.

Alternatively or additionally, the factor is a vector of values indicating at least one emissivity value.

In a preferred embodiment of the invention where the determined characteristic is a vector, determining a characteristic preferably includes:

converting radiation acquired at each of the plurality of wavelengths into a brightness temperature; and defining each component of the determined characteristic as a reciprocal of the difference between the brightness temperatures of two wavelengths.

Preferably, the plurality of wavelengths is fewer than is twenty wavelengths. Further preferably, the plurality of wavelengths is fewer than ten wavelengths. Most preferably, the plurality of wavelengths is fewer than six wavelengths.

In one preferred embodiment of the invention, radiation emitted by the object is acquired through an interposing medium with a variable transmission spectrum.

There is further provided in accordance with a preferred embodiment of the invention, a method of calibrating a multi-wavelength pyrometer including:

(a) acquiring radiation emitted by an object at a plurality of wavelengths;

(b) determining a characteristic of the acquired radiation which is based on a relationship between radiative emissions acquired at more than one wavelength;

(c) estimating a current temperature of the object;

(d) determining a factor related to a discrepancy between the current temperature and a temperature determined from the radiative emissions; and (e) storing the determined characteristic in association with the correctional factor or the current temperature.

Preferably, estimating a current temperature includes determining a temperature from the acquired radiation using a measured emissivity. Alternatively, estimating a current temperature includes determining a temperature from the acquired radiation using a stored emissivity. Alternatively, estimating a current temperature includes directly measuring the temperature. Alternatively, estimating a current temperature includes utilizing a previously determined temperature. Alternatively, estimating a current temperature includes estimating a current temperature and a current emissivity from the acquired radiation and from a previously determined emissivity. Preferably, the method includes determining an emissivity from a directly measured temperature and the acquired radiation.

Preferably, storing the determined characteristic includes:

attempting to match the determined characteristic with previously stored characteristics; and storing the determined characteristic in association with the factor or the current temperature if the matching attempt fails.

In a further preferred embodiment of the invention, where the characteristics are vectors, attempting to match preferably includes:

choosing a stored vector; and determining if each component in the determined characteristic is within 3% of its corresponding component of the stored vector.

Preferably, the method includes repeating (a)–(e) until the percentage of successful matches over a predetermined number of measurements is above a predetermined value.

Preferably, the factor is a vector of values indicating at least one emissivity value.

In a preferred embodiment of the invention, where the determined characteristic is a vector, determining a characteristic preferably includes:

converting radiation acquired at each of the plurality of wavelengths into a brightness temperature; and defining each component of the determined characteristic as a reciprocal of the difference between the brightness temperatures of two wavelengths.

Preferably, the plurality of wavelengths is fewer than twenty wavelengths. Further preferably, the plurality of wavelengths is fewer than ten wavelengths. Most preferably, the plurality of wavelengths is fewer than six wavelengths.

In a preferred embodiment of the invention, radiation emitted by the object is acquired through an interposing medium with a variable transmission spectrum.

Preferably, the factor is based on the acquired radiation.

Preferably determining a factor includes:

determining a plurality of brightness temperatures based on the acquired radiation; and determining an emissivity at each wavelength which is connected with a discrepancy between the determined current temperature and the brightness temperature at the wavelength.

There is further provided in accordance with a preferred embodiment of the invention, a method of true emissivity determination including:

(a) acquiring radiation emitted by an object at a plurality of wavelengths;

(b) determining a characteristic of the acquired radiation which is based on a relationship between radiative emissions acquired at more than one wavelength;

(c) determining a factor, using the characteristic; and (e) calculating a current emissivity of the object based on the factor.

Preferably, determining a factor includes:

attempting to match the determined characteristic with a plurality of stored characteristics to find a matched characteristic; and retrieving a factor associated with the matched characteristic.

Preferably, determining a factor further includes:

determining a new factor based on the acquired radiation and on a previously acquired temperature if the matching attempt fails; and storing the determined characteristic in association with the new factor or with the previously acquired temperature, if the matching attempt fails.

In a preferred embodiment of the invention, where the determined characteristic and the plurality of stored characteristic are vectors, attempting to match preferably includes:

choosing a stored vector; and determining if each component in the determined characteristic is within 3% of its corresponding component of the stored vector.

Preferably, calculating includes:

determining a first temperature based on the acquired radiation, where the first temperature has an error related to the factor;

correcting the error in the first temperature using the factor;

determining a second temperature based on the acquired radiation, where the second temperature has an error related to the emissivity of the object; and determining the emissivity of the object at a second wavelength based on the difference between the first temperature and the second temperature.

Preferably, the second temperature is a brightness temperature.

Preferably, the factor is a vector of values indicating at least one emissivity.

In a preferred embodiment of the invention, where the determined characteristic is a vector, determining a characteristic preferably includes:

converting radiation acquired at each of the plurality of wavelengths into a brightness temperature; and defining each component of the determined characteristic as a reciprocal of the difference between the brightness temperatures of two wavelengths.

Preferably, the plurality of wavelengths is fewer than twenty wavelengths. Further preferably, the plurality of wavelengths is fewer than ten wavelengths. Most preferably, the plurality of wavelengths is fewer than six wavelengths.

Preferably, radiation emitted by the object is acquired through an interposing medium with a variable transmission spectrum.

BRIEF DESCRIPTION OF THE DRAWINGS

The invention will be more fully understood from the following detailed description of the preferred embodiments thereof, taken in conjunction with the drawings in which.

DESCRIPTION OF THE PREFERRED EMBODIMENTS OF THE INVENTION

Figure 1:
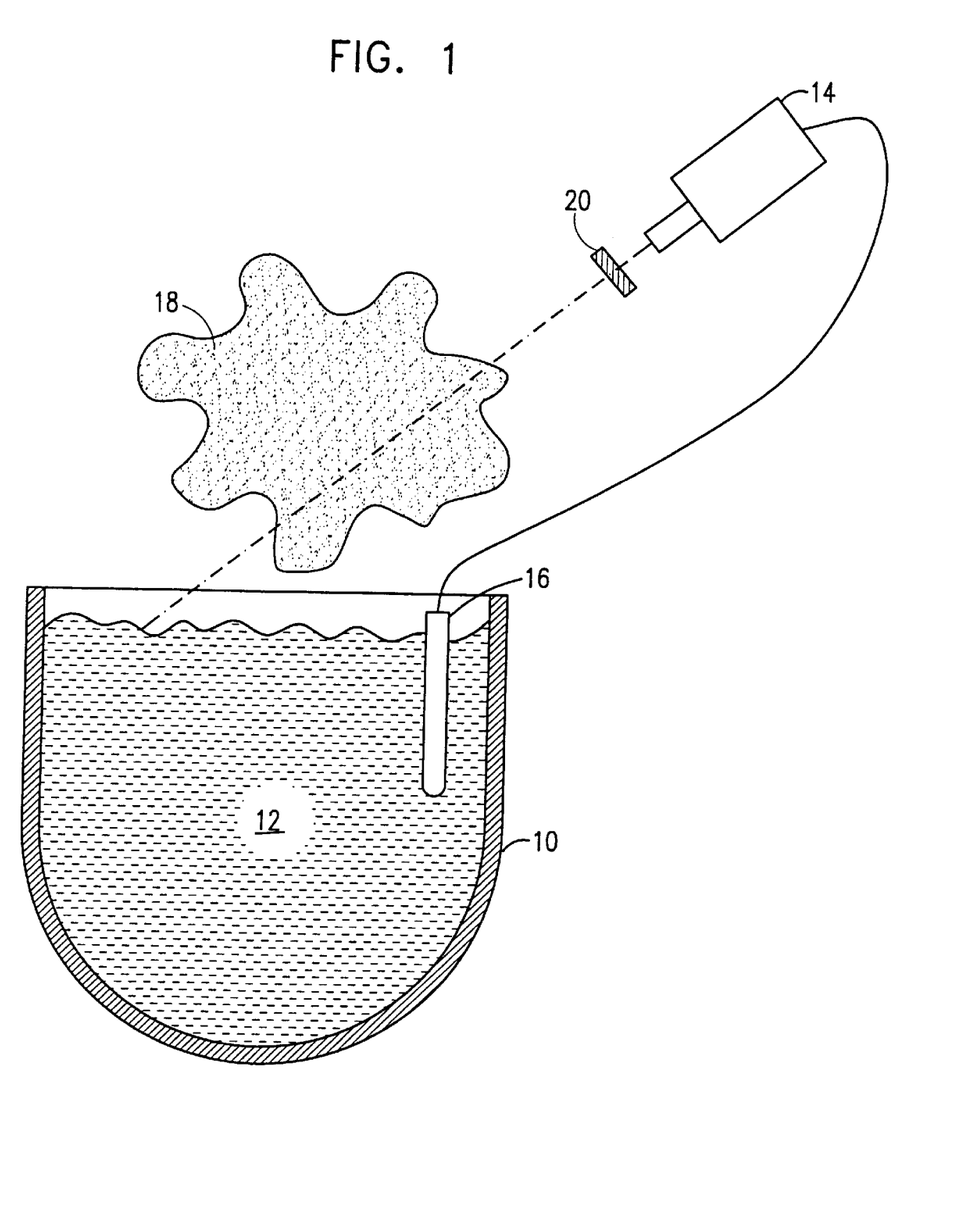
FIG. 1 is a schematic partially sectioned illustration of a side view of one implementation of a pyrometer system utilized to measure the temperature of an object in accordance with a preferred embodiment of the invention.

FIG. 1 is a schematic partially sectioned illustration of a side view of one implementation of a pyrometer system utilized to measure the temperature of an object 12 in accordance with a preferred embodiment of the invention. A pyrometer 14 for determines the temperature of object 12, such as molten metal disposed in a vat 10, through an intervening medium 18. Typically in metal working situations, pyrometer 14 is protected from the environment by a transmissive plate 20, which has a known and constant transmission spectrum. A thermocouple 16 is optionally provided for calibration, as described below.

A preferred embodiment of the present invention for determining the true temperature of object 12 is based on brightness pyrometry of object 12. If the brightness temperature of object 12 is calculated using a black-body model, the following formula is known to describe an error in the determined temperature which is caused by object 12 being gray (having an emissivity, $\epsilon \neq 1$), rather than black ($\epsilon=1$) and by the attenuating effects of intervening medium 18 and plate 20:

$$T_b^{-1} = T^{-1} - \frac{\lambda}{C_2} \ln(\varepsilon(\lambda, T) \cdot \tau(\lambda)) \qquad (1)$$

where:

$T_b$ is the determined brightness temperature of object 12;

T is the true temperature of object 12;

$\lambda$ is the wavelength at which the brightness temperature is determined;

$C_2$ is a known thermodynamic constant;

$\epsilon(\lambda, T)$ is the emissivity, which is a function of both the wavelength and the temperature; and $\tau(\lambda)$ is the transmission spectra of intervening medium 18 and plate 20.

The above equation contains three unknowns, the true temperature, the emissivity, and the transmission spectra of intervening medium 18 and plate 20. If, however, two different brightness temperatures of object 12 are subtracted from each other, the difference is not directly dependent on the true temperature of object 12, only on the emissivity of object 12 and on the transmission spectra of intervening medium 18 and plate 20:

$$T_{b1}^{-1} - T_{b2}^{-1} = R(\lambda_1, \lambda_2) \qquad (2)$$

$$= \frac{\lambda_2}{C_2} \text{Ln}(\varepsilon(\lambda_2, T) \cdot \tau(\lambda_2)) - \frac{\lambda_1}{C_2} \text{Ln}(\varepsilon(\lambda_1, T) \cdot \tau(\lambda_1))$$

As can be appreciated, a single difference value $R(\lambda_1, \lambda_2)$ does not, by itself, indicate the true temperature of object 12 because there may be several temperatures at which the difference between the emissivities of object 12 at wavelength $\lambda_1$ and at wavelength $\lambda_2$ are the same. In addition, $\tau(\lambda)$ is a random function and as such, adds noise.

The inventor has found that if several difference values of brightness temperatures at different wavelengths are aggregated to form a difference vector $\overline{R}$, this difference vector substantially indicates a unique correction factor for translating an erroneous brightness temperature into a true temperature. In addition, even a vector of relatively low order is robust enough to overcome the noise effects of $\tau(\lambda)$. A difference vector $\overline{R}$ is preferably generated by simultaneously measuring the brightness temperature of object 12 at a plurality of wavelengths and setting each component of difference vector $\overline{R}$ to the difference between the reciprocals of two consecutive brightness temperatures.

Thus, as shown in equation (1), a brightness temperature of object 12 can be corrected to determine the true temperature of object 12 using the emissivity of object 12. This emissivity, which typically cannot be accurately measured, can be known before-hand and be associated with an $\overline{R}$ difference vector. Thus, the true temperature of object 12 can be determined based on the measurement of brightness temperatures and a stored table of correction values, i.e., emissivities.

It should be appreciated that under varying conditions a plurality of different vectors $\overline{R}$ may indicate the same true temperature. For example, if the emissivity of object 12 changes due to chemical changes in object 12, difference vector $\overline{R}$ will change even though the temperature of object 12 does not.

It should also be appreciated from equation (1), that if the true temperature of object 12 is known or determined, the emissivities at each of a plurality of wavelengths can be calculated from the true temperature and the brightness temperature at the wavelength. Conversely, if the brightness temperature and the emissivities are known, the true temperature can be calculated.

Figure 2:
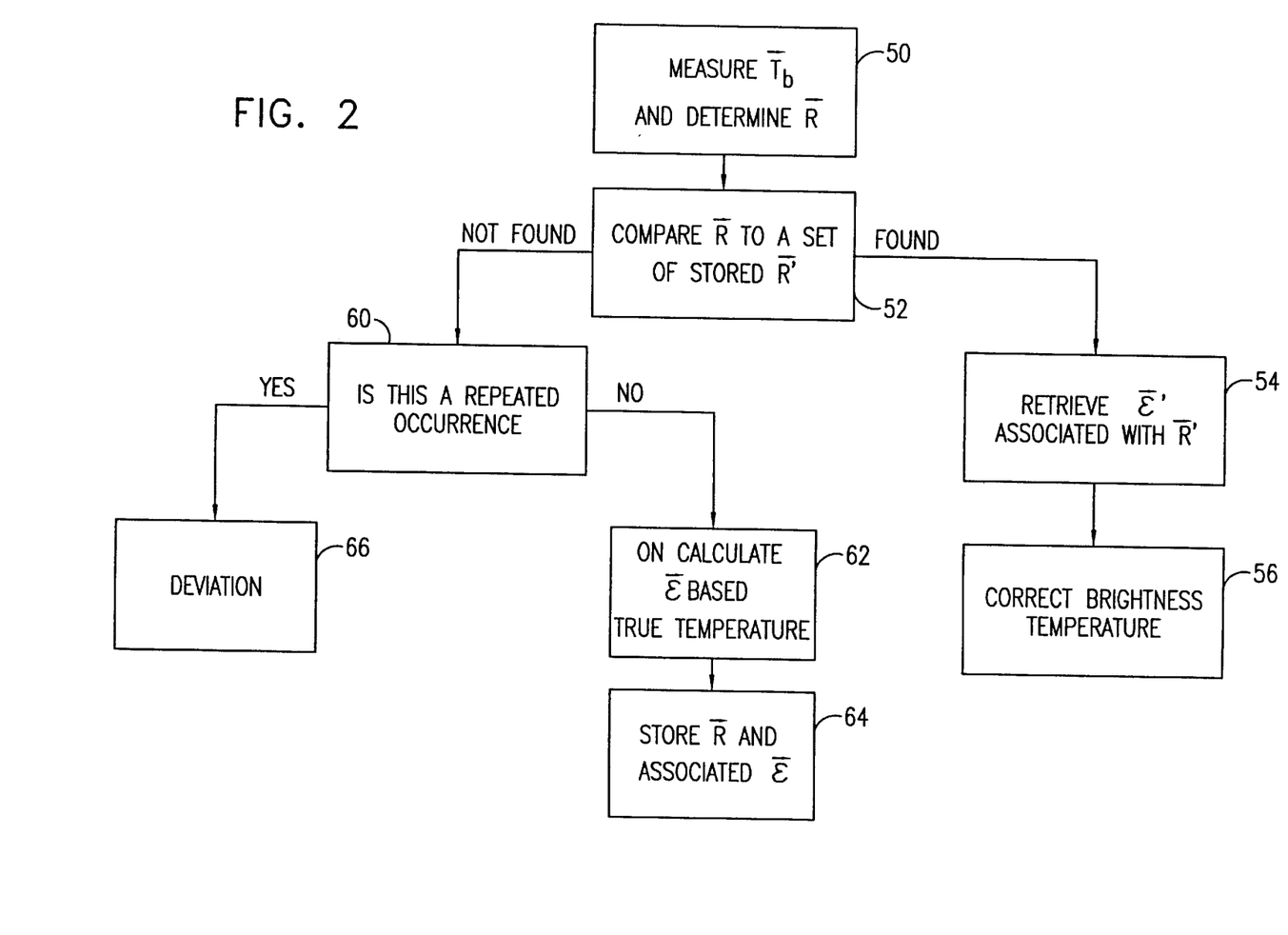
FIG. 2 is a general flowchart showing a method of true temperature determination according to a preferred embodiment of the invention.

FIG. 2 is a general flowchart showing a method of true temperature determination according to a preferred embodiment of the invention. First, as indicated by reference number 50, a vector $\overline{T}_b$ of brightness temperatures is determined by measuring radiative emissions object 12 at a plurality of wavelengths and calculating a difference vector $\overline{R}$. The calculated vector $\overline{R}$ is compared to a plurality of reference vectors $\overline{R}'$ stored in pyrometer 14. If a match is found, an emissivity vector $\overline{\epsilon}'$ stored in association with $\overline{R}'$ is retrieved (reference 54). At least one of the brightness temperatures in $\overline{T}_b$ is corrected (reference 56) using the retrieved emissivity vector $\overline{\epsilon}'$, as a correction factor in equation (1), resulting in the true temperature. Alternatively, several brightness temperatures are corrected and a weighted average of the corrected temperatures is produced as the true temperature of object 12.

If no match is found, an emissivity vector $\bar{\epsilon}$ is calculated 62 based on $\bar{R}$ and on the last determined temperature. The difference vector $\bar{R}$ and its associated emissivity vector $\bar{\epsilon}$ are stored in pyrometer 14 for later use (as indicated by reference numbers 52 and 54). One or two consecutive no-match situations do not usually result in errors in the derived emissivity vector $\bar{\epsilon}$, because the temperature of object 12 changes relatively slowly. However, a run of no-match situations usually indicates that the temperature and/or emissivity of object 12 are changing in unanticipated ways. In this case, the $\bar{R}$ vector represents an unknown situation and an error signal is typically produced. In a multi-stage process, a different plurality of $\bar{R}'$ vectors may be stored for each stage of the process.

A preferred calibration method for pyrometer 14 utilizes thermocouple 16 (FIG. 1). The calibration method is similar to the temperature determination method described in conjunction with FIG. 2. This calibration method is preferred where the emissivity of object 12 changes by a substantial amount even for small or no changes in the temperature of object 12. An example of such a process is a volatile chemical process where new compounds are continuously being synthesized and decomposed, where, typically, each compound has a different emissivity.

Typically, the calibration process is matched to a particular process to be monitored. If a process with a defined start and finish are monitored, a number of processes are usually utilized to provide calibration data. If a continuous process is to be monitored, the calibration process is typically continued until enough calibration data is acquired. A preferred method of estimating the sufficiency of the calibration data is to determine the ratio between the number of successful and unsuccessful matches between new $\bar{R}$ vectors stored $\bar{R}'$ vectors, i.e., the hit rate. This hit rate can be determined using statistical methods well known in the art. In addition, in a multi-stage process, pyrometer 14 may be separately calibrated for each stage.

To start the calibration process, thermocouple 16 is placed in contact with object 12 and allowed to return a stable reading of the temperature of object 12. After this first measurement with thermocouple 16, thermocouple 16 is not required. Rather, the temperature of object 12 is determined using the method described in conjunction with FIG. 2 and the calculated emissivity vector $\bar{\epsilon}'$ is stored in association with its $\bar{R}$ vector. It should be appreciated that in the calibration process runs of no-match situations are perfectly acceptable and anticipated.

Alternatively to using thermocouple 16 to determine the true temperature, an emissivity input, as described below with reference to FIG. 3B, may be used to correct one of the brightness temperatures. The corrected brightness temperature may be used interchangeably with the thermocouple temperature.

Preferably, no clear-cut distinction is made between calibration and usage of pyrometer 14. Rather, pyrometer is continuously calibrated to and is adapted to the measurement environment. When a long run of no-match situation is encountered after a substantial amount of calibration has been performed, an error is signal may be generated, as described above. Typically, each process has its own minimum calibration run and allowed length of no-match situations.

In the above described calibration and measurement methods the technique of matching two difference vectors $\bar{R}$ and $\bar{R}'$ is important. Preferably, a match between two vectors is defined to be successful if each and every one of the components of one vector is within a set percentage, such as 3%, of the corresponding component in the other vector. Alternatively other pattern matching methods are used, for example, two vectors are considered to match if the ratio of the vectors' magnitude is within a certain range.

In a further preferred embodiment of the invention, a neural network is used to learn difference vectors $\bar{R}'$ and their associated emissivity vectors $\bar{\epsilon}'$. Alternatively, calibration information may be stored as a multi-dimensional function, which can be determined by analyzing calibration data.

Figure 3A:
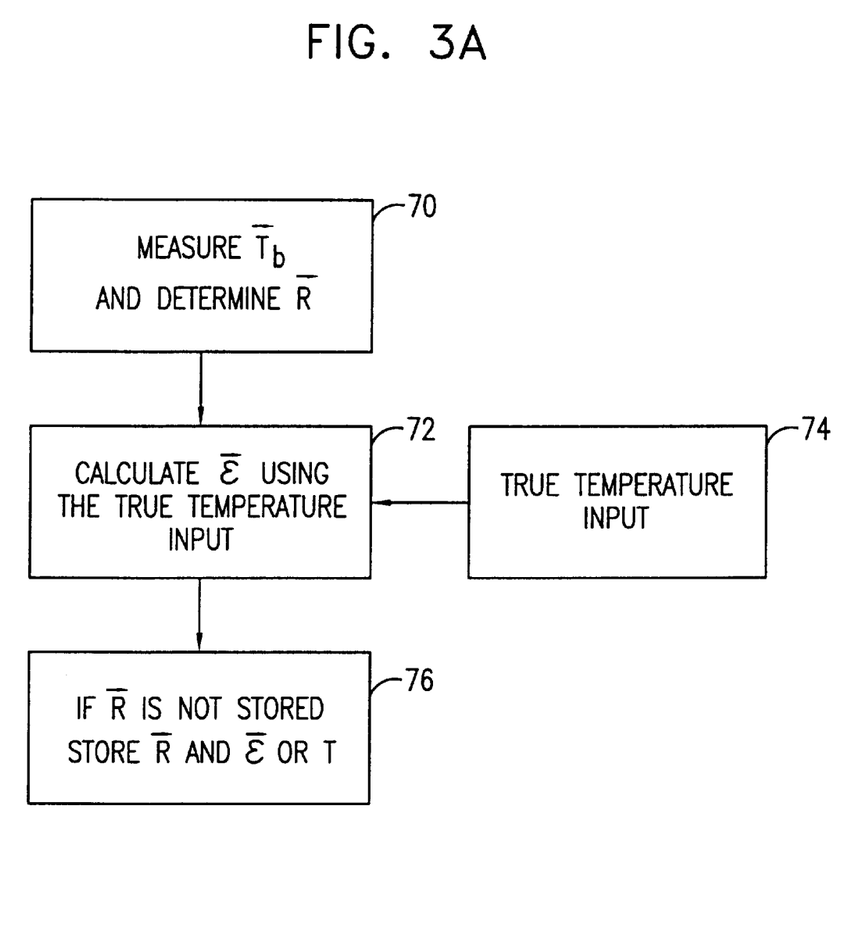
FIG. 3A is a general flowchart showing a preferred method for calibrating a true temperature- determination device built in accordance with a preferred embodiment of the invention.

FIG. 3A is a general flowchart showing an alternative preferred method for calibrating a true temperature determination device built in accordance with a preferred embodiment of the invention. Unlike the calibration method described in association with FIG. 2, the calibration method of FIG. 3A preferably uses thermocouple 16 throughout the calibration. The calibration method of FIG. 3A is especially preferred when the temperature change rate is of the same order of magnitude as the emissivity change rate.

Calibration is initiated (reference 70) by measuring $\bar{T}_b$ and calculating difference vector $\bar{R}$. Emissivity vector $\bar{\epsilon}$ is then calculated from difference vector $\bar{R}$ using an input 74 of the true temperature derived from thermocouple 16 (equation 1).

If the difference vector $\bar{R}$ does not match any vector $\bar{R}'$ that is stored in pyrometer 14, difference vector $\bar{R}$ and its associated emissivity vector $\bar{\epsilon}$ are stored in pyrometer 14.

The above calibration steps are preferably repeated until a desired matching hit-rate (of $\bar{R}$ and $\bar{R}'$) is reached.

In some cases it is not practical to measure the true temperature of object 12 using any direct contact method. In these cases, a different calibration method may be preferred.

Figure 3B:
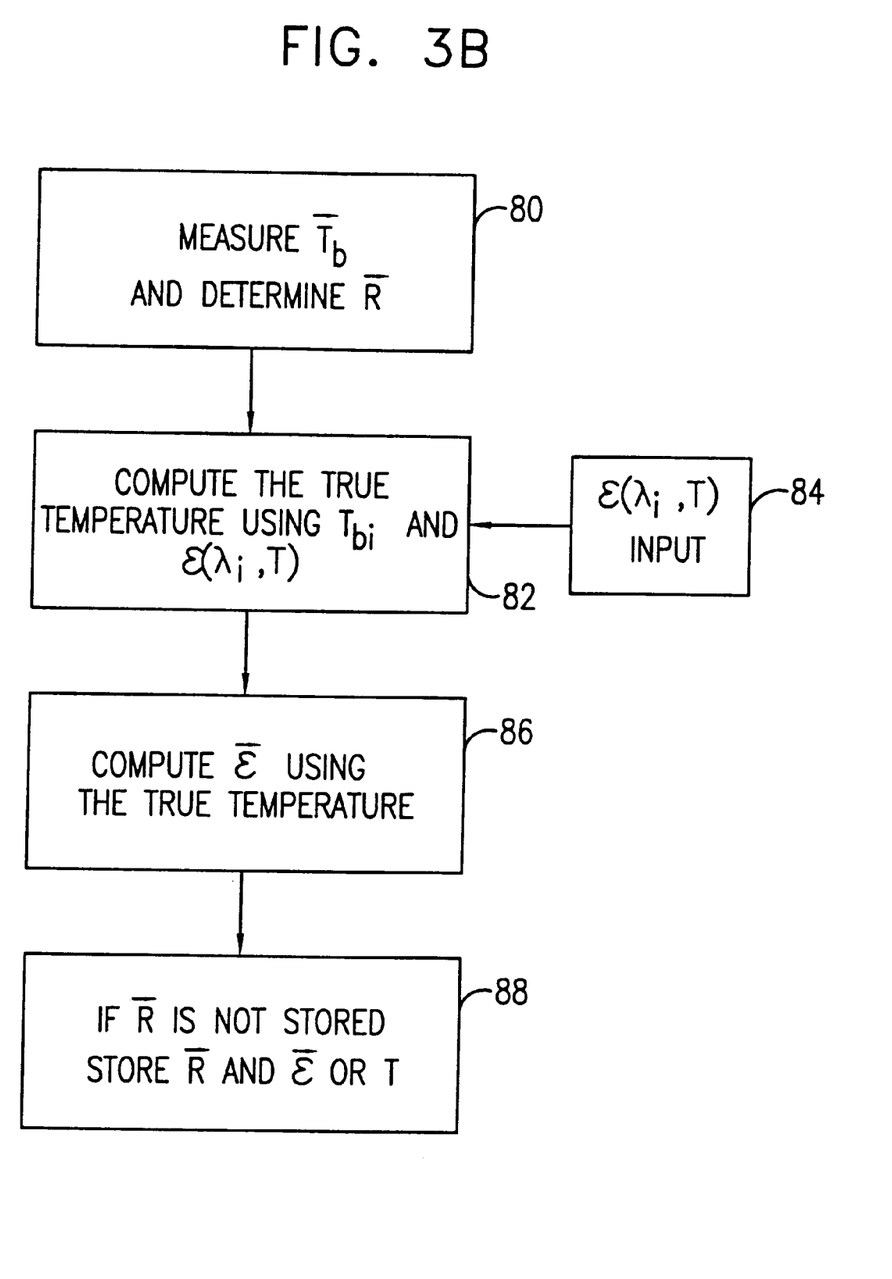
FIG. 3B is a general flowchart showing an alternative preferred method for calibrating a true temperature determination device built in accordance with a preferred embodiment of the invention.

FIG. 3B is a general flowchart show another preferred method for calibrating a true temperature determination device built in accordance with a preferred embodiment of the invention. The calibration method of FIG. 3B is also suitable for cases where the temperature change rate is similar to the emissivity change rate. Instead of acquiring the true temperature of object 12 using a thermocouple, the values of the emissivity of object 12 at one of the measuring wavelengths is used. Typically, this emissivity value is stored in a memory bank based on a known emission profile or the emissivity may be measured using an emissivity measurement device.

Calibration is initiated (reference 80) by measuring $\bar{T}_b$ and calculating $\bar{R}$ therefrom. The true temperature of object 12 is then calculated (reference 82) using one of the measured brightness temperatures of $\bar{T}_b$ and an input 84 of the emissivity of object 12 at a specific wavelength. Where the emissivity values are stored and not measured in real-time, the emissivity may be stored as a table with each value corresponding to a measured brightness temperature or alternatively each value may be associated with a step of the monitored process, at which the emissivity is known to change.

Emissivity vector $\bar{\epsilon}$ is calculated from difference vector $\bar{R}$ using the true temperature calculated in (reference 82).

If difference vector $\bar{R}$ does not match any vector $\bar{R}'$ that is stored in pyrometer 14, difference vector $\bar{R}$ and its associated emissivity vector $\bar{\epsilon}$ are stored in pyrometer 14.

The above calibration steps are preferably repeated until a desired matching hit-rate (of $\bar{R}$ and $\bar{R}'$) is reached.

In some cases, it is not practical to use the calibration methods described in reference to FIG. 3A or FIG. 3B. If the magnitude of the temperature change rate is similar to the magnitude of the emissivity change rate the following calibration method may be preferred.

Figure 4:
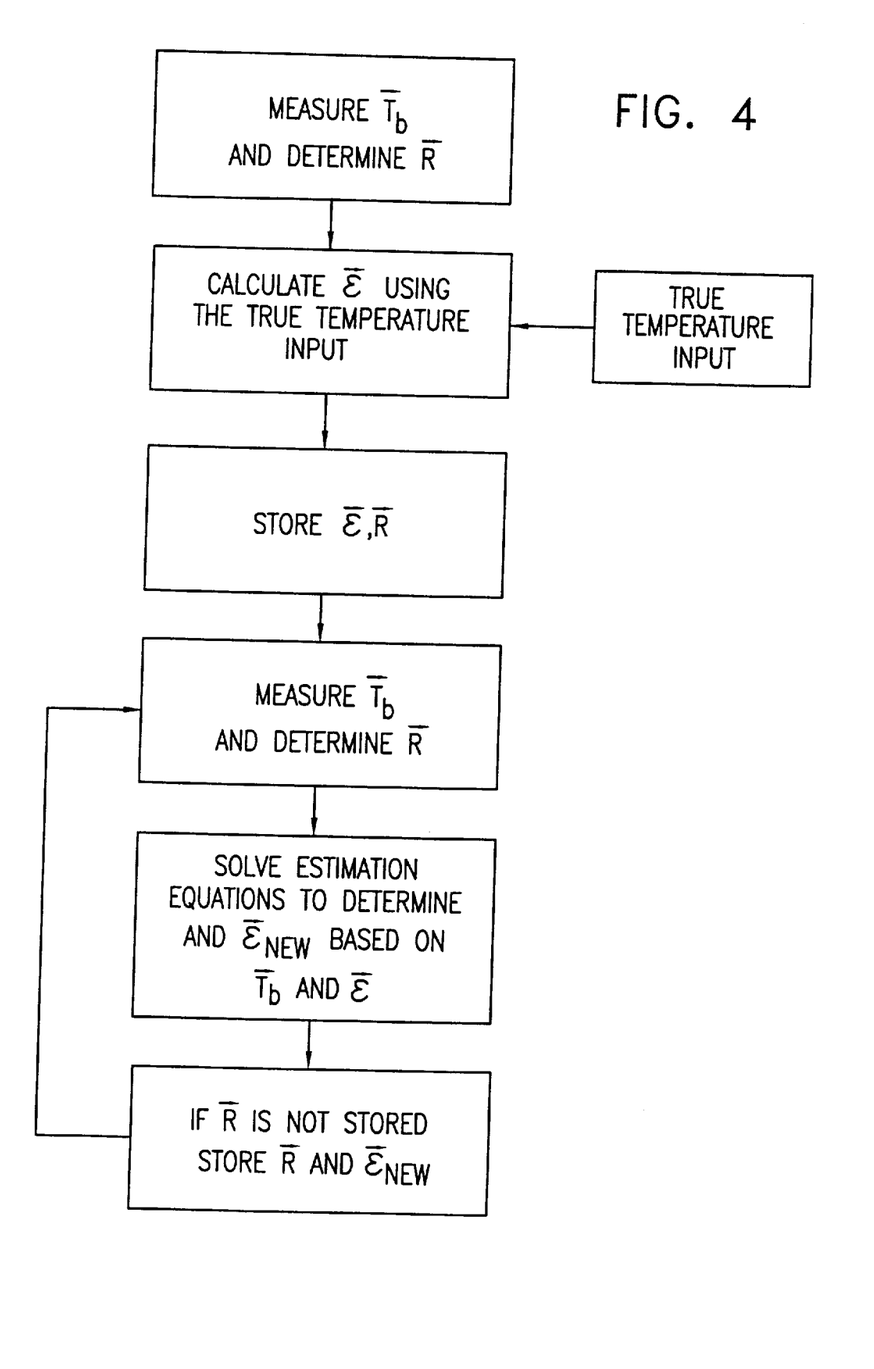
FIG. 4 is a general flowchart showing another alternative preferred method for calibrating a true temperature determination device built in accordance with a preferred embodiment of the invention.

To start the calibration process, thermocouple 16 is placed in contact with object 12 and allowed to return a stable reading of the temperature of object 12. After this first measurement with thermocouple 16, thermocouple 16 is not required. The brightness temperature $\overline{T}_b$ of object 12 is measured and a difference vector $\overline{R}$ is determined from brightness temperature $\overline{T}_b$. $\overline{\epsilon}$ is calculated from $\overline{T}_b$ using the true temperature input from thermocouple 16 and is stored in association with $\overline{R}$. This ends a first calibration cycle, which is similar to the calibration cycle described in reference with FIGS. 2 and 3A. Further calibration cycles start with a measurement of $\overline{T}_b$ and a determination of $\overline{R}$ from $\overline{T}_b$. Both $\overline{\epsilon}$ and the true temperature are assumed to have changed since the last calibration cycle, however, $\overline{T}$ and $\overline{\epsilon}_{new}$ may be estimated from $\overline{T}_b$ and a previously determined $\overline{\epsilon}$ by solving the following set of equations:

$$T_{b1}^{-1} = T^{-1} - \frac{\lambda_1}{C_2}\ln\varepsilon_1 - \frac{\lambda_1}{C_2}\ln\kappa_1 \qquad (3)$$

$$T_{b2}^{-1} = T^{-1} - \frac{\lambda_2}{C_2}\ln\varepsilon_2 - \frac{\lambda_2}{C_2}\ln\kappa_1 - \frac{\lambda_2}{C_2}\ln\left[1 + \frac{\partial\kappa}{\kappa_1\cdot\partial\lambda_1}(\lambda_1-\lambda_2)\right]$$

$$T_{bn}^{-1} = T^{-1} - \frac{\lambda_n}{C_2}\ln\varepsilon_n - \frac{\lambda_n}{C_2}\ln\kappa_1 -$$

$$\frac{\lambda_n}{C_2}\ln\left[1 + \frac{\partial\kappa}{\kappa_1\cdot\partial\lambda_1}(\lambda_1-\lambda_n) + \ldots + \frac{\partial_\kappa^n}{\partial\lambda^n\kappa_1}\frac{(\lambda_1-\lambda_n)^n}{n!}\right]$$

where $$\kappa_i = \varepsilon_i(\text{NEW})/\varepsilon_i(\text{OLD}) \qquad (4)$$

$$\kappa_j - \kappa_i = \kappa_0 + \frac{\partial\kappa}{\partial\lambda}(\lambda_j-\lambda_i) + \ldots + \frac{\partial_\kappa^n}{\partial\lambda^n}\frac{(\lambda_j-\lambda_i)^n}{n!} \qquad (5)$$

It should be noted, that if n brightness temperatures are used, the approximation of κ is of the order of n−2. Higher orders of κ are preferably assumed to be 0. If a higher number of wavelengths are used, the accuracy of the estimation is enhanced.

$\overline{\epsilon}_{new}$ and $\overline{R}$ are stored, as described with reference to the previously described calibration methods and a new calibration cycle is started.

In the above described methods it is described to store an emissivity vector in association with a difference vector. It should be appreciated, that it is not necessary to store emissivity values. Rather, what is stored is a factor which is related to the error. For example, if the true temperature is stored in association with the difference vector, the emissivity values can be calculated when the true temperature is retrieved. Thus, all that is required is that the value(s) stored in association with the difference vector be operative to reconstruct a corrective factor for at least one of the measured brightness temperatures.

Figure 5:
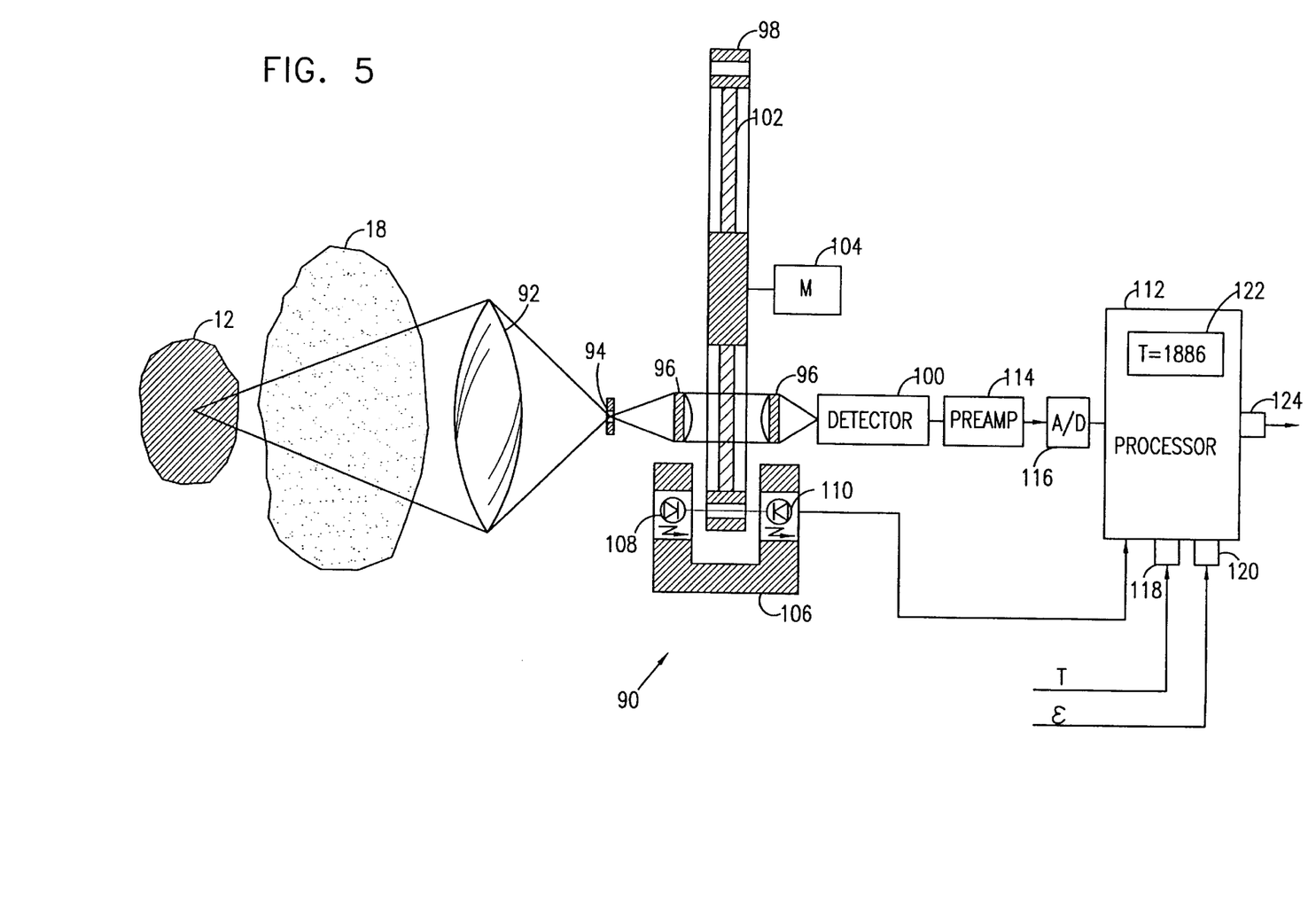
FIG. 5 is a partially schematic illustration of a side view of a true temperature determination device according to a preferred embodiment of the invention.

FIG. 5 is a schematic side view of a pyrometer 90 according to a preferred embodiment of the invention. Radiative emissions are emitted by object 12, pass through intervening material 18 and are detected by a radiation detector 100 which generates signals corresponding to the impinging radiation. Preferably, a lens 92 and an iris 94 are used to direct a portion of the radiative emissions to detector 100. Alternatively or additionally, another type of wave guide is used, such as a high emissivity tube or a tube constructed of a material with a high reflectivity. The choice between the wave guiding method preferably depends on the size of the portion of object 12 being measured and the amount of reflections in the measurement area.

As described hereinabove, the true temperature of object 12 is determined from a plurality of brightness temperatures, each of which is measured at a different wavelength. In a preferred embodiment of the invention, a multi-filter chopper wheel 98, having a plurality of color filters 102, selectably filters the radiative emissions so that only radiation of a narrow wavelength reaches detector 100 at a time. In a preferred embodiment of the invention, four filters, having transmission wavelengths of $0.7\mu$, $0.8\mu$, $0.9\mu$ and $1\mu$, for example, are used. The transmission spectra of each filter is preferably about 10 nanometers wide, although narrower or broader spectral widths can be used. Preferably, filters 102 are circumferentially arranged around of wheel 98 and a motor 104 spins wheel 98 so that at any instant only one of filters 102 is disposed between detector 100 and object 12. Preferably, an objective optics 96, such as a lens, forms the radiative emissions into a wide beam, so that small non-uniformities in filters 102 are averaged out.

The angular position of wheel 98 is preferably detected by a detector such as, for example, an optical counter 106. Holes are formed in wheel in locations which correspond to each of the angular position of filters 102. When one of filters 102 is disposed between object 12 and detector 100, a hole in wheel 98 allows light from a light source 108 to pass through wheel 98 and impinge on detector 110, so that a first signal is generated by counter 106. When a non-filter portion of wheel 98 is disposed between object 12 and detector 100, wheel 98 blocks light from passing from source 108 to detector 110, so that a second signal is generated by counter 106. In addition counter 106 is useful as a synchronization mechanism between wheel 98 and the processing of signal from detector 100.

Alternatively, the angular position of wheel 98 can be determined from the pauses in the impingement of radiation on detector 100. Preferably, the angular distance between filters 7 is not equal, so that a reference angular position on wheel 98 can be determined by analyzing the length of the pauses in the impingement of radiation on detector 100. Alternatively, other rotation determining means known in the art are use to determine the currently operative filter 7.

Preferably, wheel 98 completes a complete rotation in a short time, such as 20 milliseconds.

It should be appreciated that other methods of detecting emissive radiation at a plurality of individual wavelengths are known in the art and are operative instead of a filter chopper wheel 98. For example, in an alternative embodiment of the invention a prism is used to differentially defract the radiative emissions and detector 100 is moved through the defracted spectrum.

The signals generated by detector 100 are processed, as described hereinabove, by a processor 112, to determine the true temperature. Typically, detector 100 generates analog signals which are preferably amplified by a preamplifier 114 before being converted to a digital form by an analog to digital converter 116.

Preferably, pyrometer 90 has a local display 122 which displays the determined true temperatures and/or the determined emissivities. A port 124 preferably connects pyrometer 90 to external devices such as a remote display, a controlling computer or for data transfer. Port 124 may be an analog port, such as a voltage output or alternatively a digital port such as an RS232 port or an RS485 port.

Preferably, an input port 118 is used to input a temperature signal from an external source, such as a thermocouple, for calibration as described hereinabove. Additionally or alternatively, pyrometer 90 has an input port 120 for inputting an emissivity value, as described above.

Figure 6:
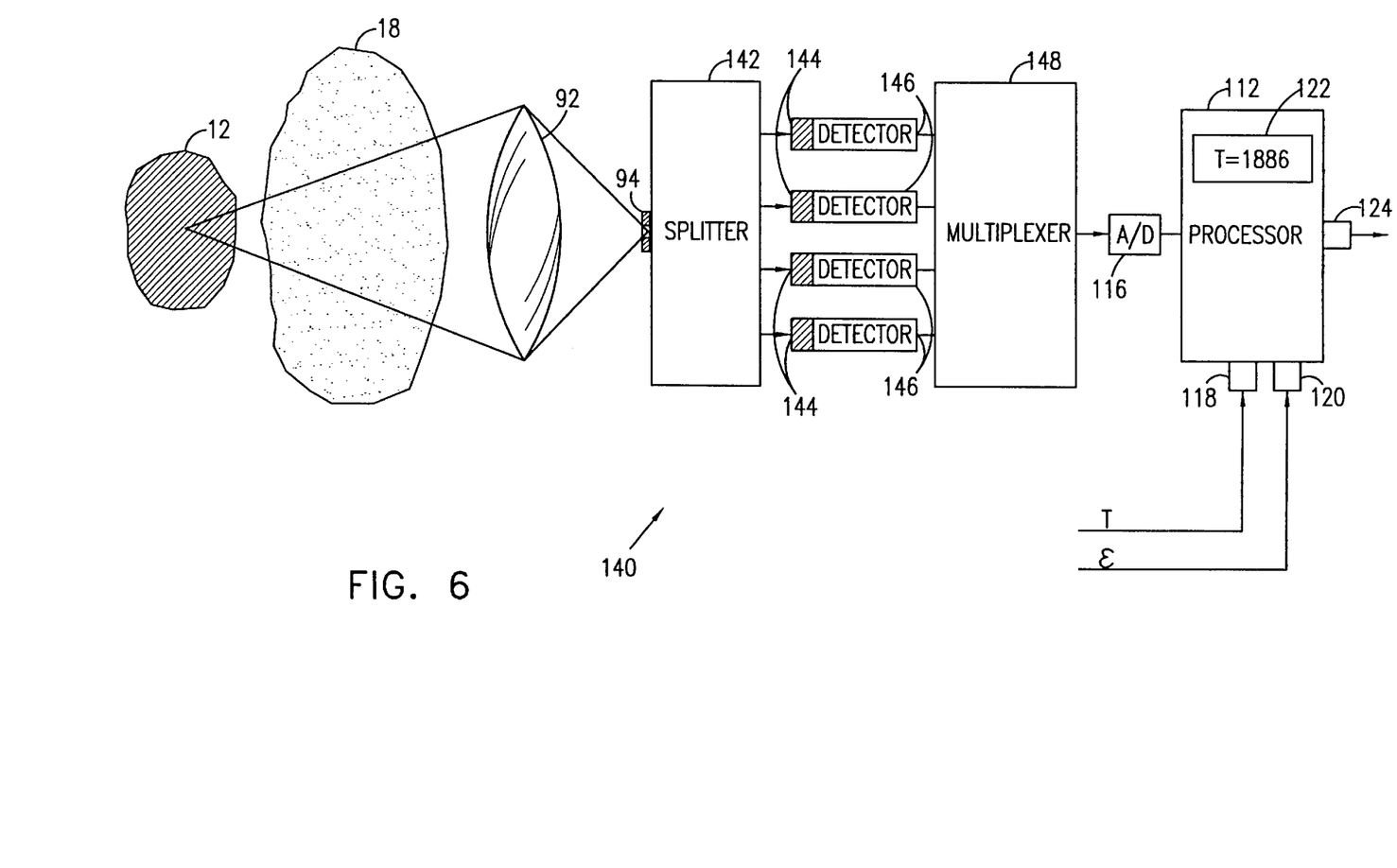
FIG. 6 is a partially schematic illustration of a side view of a true temperature determination device according to another preferred embodiment of the invention.

FIG. 6 is a schematic side view of a multi-channel pyrometer 140 according to another preferred embodiment of the invention. Serial pyrometer 90 described in conjunction with FIG. 5 is typically not suited for measuring temperatures of objects having rapid changes in emissivity and/or temperature. Multi-channel pyrometer 140 measures radiative emissions at several wavelengths simultaneously, so that a shorter sampling time, such as 10 micro seconds, is possible.

As described with reference to pyrometer 90, optics 92 and iris 94 or other means as described hereinabove collect radiative emissions. An optical splitter 142, such a mirror system or a prism, directs portions of radiation to each of a plurality of detectors 146, each of which generates a signal corresponding to the impinging radiation. A plurality of filters 144 are disposed between splitter 142 and detectors 146 such that each detector 146 has one filter 144 associated therewith. Filters 144 correspond to filters 102 in FIG. 5. The signals generated by detectors 146 are passed to processor 112 which then processes the signals as described hereinabove.

Preferably a multiplexer 148 multiplexes the signals from detectors 146 to analog to digital converter 116. Alternatively, converter 116 has a plurality of channels, so no multiplexing is necessary. Further alternatively, detectors 146 generate digital signals which are either multiplexed by multiplexer 148 and sent to processor 112 or, alternatively processor 112 has a plurality of digital input channels so that it is directly connected to a plurality of detectors 146.

It should be appreciated that the above described methods and apparatus are especially useful for process monitoring. In one embodiment of the present invention, temperature monitoring is performed. At each stage of an industrial process the temperature of the material must be within a range of temperatures. If the measured temperature in not within the required range, at the particular process step, a process deviation is detected. Changes in the emissivity of a material typically mirror changes in the chemical and crystalline properties of the material. In some processes, a step is performed until a desired effect on the material is realized. Thus, the end of a step can be determined by monitoring changed in emissivity of the material. Alternatively or additionally, deviations of the emissivity of the material from an accepted range indicate a deviation in the process.

A pyrometer according to an embodiment of the invention as described in conjunction with FIG. 5, was tested in a steel mill. In this embodiment, processor 112 was a PC computer and converter 116 was a standard A/D card. The computer software is included as part of Israeli patent application No. 115,192, filed on Sep. 6, 1995, titled "Method and Apparatus for True Temperature Measurement of Real Bodies", by assignee Thermodevice LTD., the disclosure of which is incorporated herein by reference. The pyrometer was used to continuously determine the temperature of molten steel flowing out from a tandish and in a bucket of molten steel. The temperature range was 1000–2000 degrees Celsius. The temperature of the molten steel was determined to an accuracy of 0.5% in environmental conditions which included changing emissivities and intervening materials such as smoke. For comparison purposes, a brightness pyrometer and a color-ratio pyrometer were used to measure the temperature of the molten steel in parallel to the pyrometer of the instant invention. In addition, the temperatures were also measured using a thermocouple (Pt-PtRh), for reference purposes.

Table 1 summarizes the accuracy of the temperature measurement results that were obtained in this experiment. All the results are shown relative to temperatures measured by the thermocouple.

TABLE 1

|  | Brightness pyrometer | Color-ratio Pyrometer | True-Temperature Pyrometer |
|---|---|---|---|
| Flow through the Tandish | −4% to −10% | +2% to +5% | ±0.5% to ±1% |
| Bucket | −3% to −7% | +3% to +6% | ±0.8% to ±1.2% |

In a second experiment, the temperature of a black-body radiation source was measured as viewed through a variety of filters. In this experiment, the temperature of the black body was measured using a brightness pyrometer, a color pyrometer and a pyrometer built in accordance with an embodiment of the present invention.

Table 2 lists six experiments, in each experiment the filter used was a different one and a variety of black-body temperatures were set up.

TABLE 2

| Type Of Filter | Temperature (degrees Celsius) | | | |
|---|---|---|---|---|
| | Black Body | Brightness Pyrometer | Color-ratio pyrometer | True-Temperature Pyrometer |
| None | 1361 | 1361 | 1367 | 1358 |
| Shot Kb-2 | 1361 | 1068 | Off Scale | 1357 |
| Yellow Glass | 1361 | 1341 | 1373 | 1358 |
| Pyrex | 1361 | 1322 | 1396 | 1356 |
| Water + Glass | 1006 | Off Scale | 1010 | 1001 |
| Lexan | 1006 | 995 | 992 | 1000 |

The experiment was performed at the Williamson corporation, Concord, Mass. on Jul. 24, 1995. The brightness pyrometer and the color-ratio pyrometer using in the experiment were both models constructed by the Williamson Corporation.

The invention has been generally described as using brightness temperatures and correctional factors, for correcting brightness temperatures, which are based on the emissivities. It should be appreciated that color-ratio temperatures can be used instead of brightness temperatures in operatives embodiments of the invention. For example, basing the difference vectors on differences between reciprocals of color temperatures and making the appropriate changes in the correctional factors. If color pyrometry is used instead of brightness pyrometry as a basis for practicing the present invention, the correctional factors may be based on emissivity ratios, instead of on emissivities, as preferred in brightness pyrometry based methods of the present invention. The relationship between color and brightness temperatures is $$T_c^{-1} = \left( \frac{1}{\lambda_1} \cdot T_{b1}^{-1} - \frac{1}{\lambda_2} \cdot T_{b2}^{-1} \right) \cdot \frac{1}{1/\lambda_1 - 1/\lambda_2} \qquad (6)$$

It should also be appreciated that the scope of the invention is not limited to using a difference vector as the matching vector. Rather, other vectors, such as vectors consisting of the differences between one temperature and all the other temperatures can be used, with appropriate changes in the formulas. Such vectors are generally characterized as functionally related to the relationship between at least radiative emissions at at least two different wavelength and by not being directly dependent on the temperature. Further, a single value can be used instead of a vector, however, it should be appreciated that in current computer technology, even single values are stored as vectors of single digit binary numbers.

Furthermore, although the invention has been described as using a small number of wavelengths, particularly four, a larger or smaller number of wavelengths can be used with a resulting greater or lower accuracy.

It will be appreciated by a person skilled in the art that the invention is not limited by what has been described hereinabove. Rather, the scope of the invention is only limited by the claims which follow.

I claim:

1. A method of true temperature determination comprising:

(a) acquiring radiation emission levels respectively from an object at a plurality of wavelengths to form approximations of a true temperature of said object;

(b) determining a characteristic of the acquired radiation which is based on a relationship between said respective radiative emission levels acquired at said plurality of wavelengths;

(c) determining a correctional factor, related to errors in said approximations, by attempting to match the determined characteristic with each of a plurality of stored characteristics, each having an associated correctional factor to, find a matched characteristic, and retrieving the correctional factor associated with the matched characteristic; and (d) calculating a true temperature of the object by applying said correctional factor to said determined characteristic.

2. A method according to claim 1, wherein determining a factor further comprises:

determining a new factor based on the acquired radiation and on a previously acquired temperature if the matching attempt fails; and storing the determined characteristic in association with the new factor or with the previously acquired temperature, if the matching attempt fails.

3. A method according to claim 2, wherein the determined characteristic and the plurality of stored characteristic are vectors and wherein attempting to match comprises:

choosing a stored vector; and determining if each component in the determined characteristic is within 3% of its corresponding component of the stored vector.

4. A method according to claim 1, wherein calculating comprises:

determining a temperature based on the acquired radiation, wherein the determined temperature has an error related to the factor; and correcting the error in the determined temperature using the factor.

5. A method according to claim 4, wherein the determined temperature is a brightness temperature.

6. A method according to claim 1, wherein the factor is a vector of values indicating at least one emissivity value.

7. A method according to claim 1, wherein the determined characteristic is a vector and wherein the determining a characteristic comprises:

converting radiation acquired at each of the plurality of wavelengths into a brightness temperature; and defining each component of the determined characteristic as a reciprocal of the difference between the brightness temperatures of two wavelengths.

8. A method according to claim 1, wherein the plurality of wavelengths is fewer than twenty wavelengths.

9. A method according to claim 1, wherein the plurality of wavelengths is fewer than ten wavelengths.

10. A method according to claim 1, wherein the plurality of wavelengths is fewer than six wavelengths.

11. A method according to claim 1, wherein radiation emitted by the object is acquired through an interposing medium with a variable transmissioned spectrum.

12. A method of calibrating a multi-wavelength pyrometer comprising:

(a) acquiring radiation emitted by an object at a plurality of wavelengths;

(b) determining a characteristic of the acquired radiation which is based on a relationship between radiative emissions acquired at more than one wavelength;

(c) estimating a current temperature of the object;

(d) determining a factor related to a discrepancy between the current temperature and a temperature determined from the radiative emissions; and (e) storing the determined characteristic in association with the correctional factor or the current temperature.

13. A method according to claim 12, wherein estimating a current temperature comprises determining a temperature from the acquired radiation using a measured emissivity.

14. A method according to claim 12, wherein estimating a current temperature comprises determining a temperature from the acquired radiation using a stored emissivity.

15. A method according to claim 12, wherein estimating a current temperature comprises directly measuring the temperature.

16. A method according to claim 12, wherein estimating a current temperature comprises estimating a current temperature and a current emissivity from the acquired radiation and from a previously determined emissivity.

17. A method according to claim 16, comprising determining an emissivity from a directly measured temperature and the acquired radiation.

18. A method according to claim 12, wherein estimating a current temperature comprises utilizing a previously determined temperature.

19. A method according to claim 12, wherein storing the determined characteristic comprises:

attempting to match the determined characteristic with previously stored characteristics; and storing the determined characteristic in association with the factor or the current temperature if the matching attempt fails.

20. A method according to claim 19, wherein the characteristics are vectors and wherein attempting to match comprises:

choosing a stored vector; and determining if each component in the determined characteristic is within 3% of its corresponding component of the stored vector.

21. A method according to claim 19, comprising repeating (a)–(e) until the percentage of successful matches over a predetermined number of measurements is above a predetermined value.

22. A method according to claim 12, wherein the factor is a vector of values indicating at least one emissivity value.

23. A method according to claim 12, wherein the determined characteristic is a vector and wherein determining a characteristic comprises:

converting radiation acquired at each of the plurality of wavelengths into a brightness temperature; and defining each component of the determined characteristic as a reciprocal of the difference between the brightness temperatures of two wavelengths.

24. A method according to claim 12, wherein the plurality of wavelengths is fewer than twenty wavelengths.

25. A method according to claim 12, wherein the plurality of wavelengths is fewer than ten wavelengths.

26. A method according to claim 12, wherein the plurality of wavelengths is fewer than six wavelengths.

27. A method according to claim 12, wherein radiation emitted by the object is acquired through an interposing medium with a variable transmission spectrum.

28. A method according to claim 12, wherein the factor is based on the acquired radiation.

29. A method according to claim 12, wherein determining a factor comprises:

determining a plurality of brightness temperatures based on the acquired radiation; and determining an emissivity at each wavelength which is connected with a discrepancy between the determined current temperature and the brightness temperature at the wavelength.

30. A method of true emissivity determination comprising:

(a) acquiring radiation emission levels respectively from an object at a plurality of wavelengths to form approximations of a true temperature of said object;

(b) determining a characteristic of the acquired radiation which is based on a relationship between said respective radiative emission levels acquired at said plurality of wavelengths;

(c) determining a factor, related to errors in said approximations, by attempting to match the determined characteristic with each of a plurality of stored characteristics, each having an associated factor, to find a matched characteristic, and retrieving the factor associated with the matched characteristic; and (d) calculating a true emissivity of the object by applying said factor to said determined characteristic.

31. A method according to claim 30, wherein determining a factor further comprises:

determining a new factor based on the acquired radiation and on a previously acquired temperature if the matching attempt fails; and storing the determined characteristic in association with the new factor or with the previously acquired temperature, if the matching attempt fails.

32. A method according to claim 30, wherein the determined characteristic and the plurality of stored characteristic are vectors and wherein attempting to match comprises:

choosing a stored vector; and determining if each component in the determined characteristic is within 3% of its corresponding component of the stored vector.

33. A method according to claim 30, wherein calculating comprises:

determining a first temperature based on the acquired radiation, wherein the first temperature has an error related to the factor;

correcting the error in the first temperature using the factor;

determining a second temperature based on the acquired radiation, wherein the second temperature has an error related to the emissivity of the object; and determining the emissivity of the object at a second wavelength based on the difference between the first temperature and the second temperature.

34. A method according to claim 33, wherein the second temperature is a brightness temperature.

35. A method according to claim 30, wherein the factor is a vector of values indicating at least one emissivity.

36. A method according to claim 30, wherein the determined characteristic is a vector and wherein the determining a characteristic comprises:

converting radiation acquired at each of the plurality of wavelengths into a brightness temperature; and defining each component of the determined characteristic as a reciprocal of the difference between the brightness temperatures of two wavelengths.

37. A method according to claim 30, wherein the plurality of wavelengths is fewer than twenty wavelengths.

38. A method according to claim 30, wherein the plurality of wavelengths is fewer than ten wavelengths.

39. A method according to claim 30, wherein the plurality of wavelengths is fewer than six wavelengths.

40. A method according to claim 30, wherein radiation emitted by the object is acquired through an interposing medium with a variable transmission spectrum.

* * * * *